(12) United States Patent
Gericke

(10) Patent No.: US 7,861,526 B2
(45) Date of Patent: Jan. 4, 2011

(54) STEAM GENERATION PLANT AND METHOD FOR OPERATION AND RETROFITTING OF A STEAM GENERATION PLANT

(75) Inventor: Bernd Gericke, Cologne (DE)

(73) Assignee: Man Turbo AG, Oberhausen (DE)

( * ) Notice: Subject to any disclaimer, the term of this patent is extended or adjusted under 35 U.S.C. 154(b) by 559 days.

(21) Appl. No.: 11/921,811

(22) PCT Filed: Jun. 3, 2006

(86) PCT No.: PCT/EP2006/005334

§ 371 (c)(1),
(2), (4) Date: Jan. 7, 2008

(87) PCT Pub. No.: WO2006/131283

PCT Pub. Date: Dec. 14, 2006

(65) Prior Publication Data
US 2010/0132360 A1 Jun. 3, 2010

(30) Foreign Application Priority Data
Jun. 8, 2005 (DE) .................. 10 2005 026 534

(51) Int. Cl.
*F01K 7/34* (2006.01)
(52) U.S. Cl. .................... 60/653; 60/677
(58) Field of Classification Search ............ 60/653, 60/677–680
See application file for complete search history.

(56) References Cited

U.S. PATENT DOCUMENTS

| | | | |
|---|---|---|---|
| 4,545,787 A | 10/1985 | Hegarty | |
| 5,623,822 A * | 4/1997 | Schuetzenduebel et al. | 60/39.182 |
| 6,101,982 A * | 8/2000 | Fischer et al. | 122/1 R |
| 6,709,573 B2 * | 3/2004 | Smith | 208/390 |
| 6,868,677 B2 * | 3/2005 | Viteri et al. | 60/784 |
| 7,143,572 B2 | 12/2006 | Ooka et al. | |
| 7,284,362 B2 | 10/2007 | Marin et al. | |
| 2003/0131582 A1 * | 7/2003 | Anderson et al. | 60/39.55 |
| 2004/0065088 A1 * | 4/2004 | Viteri et al. | 60/772 |
| 2004/0128975 A1 * | 7/2004 | Viteri | 60/39.55 |

* cited by examiner

Primary Examiner—Hoang M Nguyen
(74) Attorney, Agent, or Firm—Cohen Pontani Lieberman & Pavane LLP

(57) ABSTRACT

The invention relates to a steam generation plant, comprising a steam generator (1) with a combustion chamber (8), an evaporator, a superheater (9), an intermediate superheater (12), a condenser (14), a feed water preheater (16, 19, 19') regeneratively heated by steam, a steam turbine set (2) with a high-pressure section (4), a medium pressure section (5) and a low-pressure section (6), a flue gas line (22), connected to the combustion chamber (8), an air supply line (21), for the supply of combustion air to the burner in the combustion chamber (8) and an air preheater (3) with flue gas and combustion air passing therethrough. An air line (23) branches off from the air supply line (21) downstream of the air preheater (3) in said steam generation plant and supplies an air-fractionation unit (25). Air coolers (34, 35) are arranged in the air line (23) through which the condensate or feed water from the condensate/feed water circuit from the steam generator (1) flows. The oxygen output from the air fractionation unit (25) is connected to the burner of the combustion chamber (8) by means of an oxygen line (26).

23 Claims, 4 Drawing Sheets

STEAM GENERATION PLANT AND METHOD FOR OPERATION AND RETROFITTING OF A STEAM GENERATION PLANT

CROSS-REFERENCE TO RELATED APPLICATIONS

This is a U.S. national stage of International Application No. PCT/EP2006/005334, filed on 3 Jun. 2006. Priority is claimed on German Application No. 10 2005 026 534.0, filed on 8 Jun. 2005.

BACKGROUND OF THE INVENTION

1. Field of the Invention

The invention pertains to a steam generating plant of the type having a steam generator including a combustor; a set of steam turbines; a condensate circuit connected to the steam generator; a flue gas line connected to the combustor; an air feed line for supplying combustion air to the combustor; and an air pre-heater wherein the combustion air is pre-heated by the flue gas.

2. Description of the Related Art

By burning fossil fuels, these types of steam generating plants generate the $CO_2$ which is held responsible for the destruction of the ozone layer of the atmosphere. Industry and various universities are therefore conducting joint research projects to develop ways of separating $CO_2$ from the flue gas produced in the power generation industry.

These joint development projects include the conversion of CO with $H_2O$ to $CO_2$ and $H_2$, followed by separation of the $CO_2$ in an integrated gasification combined cycle (IGCC process), and the combustion of fossil fuel with pure oxygen and subsequent separation of the $CO_2$ (oxy-fuel process). According to current estimates, it will take some time, e.g., about 10-20 years, before it will be possible to realize the construction of new steam generating plants based on the oxy-fuel process, and even then it will be associated with high investment costs.

It could be much more favorable to retrofit existing, conventionally fired power plants, because the investments would be much lower. Because of the $CO_2$ separations associated with combustion with pure oxygen, only power plant blocks of the higher power output ranges of 100-300 MW can be considered for an oxy-fuel retrofit. This is true not only because of the cost but also because of the size of the compressor units which must be used.

SUMMARY OF THE INVENTION

The invention is therefore based on the task of retrofitting a steam generating plant of the general type in question fired with pure oxygen (oxy-fuel process) in such a way that the steam generating plant can be operated according to either the oxy-fuel process or the conventional process.

For a steam generating plant of the general type in question and for a process for operating or retrofitting a plant of this type, an air line is connected to the air feed line at a connection downstream of the air pre-heater, air coolers cooled by condensate from the condensate circuit are installed in the air line downstream of the connection, an air separation plant is connected to the air line downstream of the air coolers, and an oxygen line is installed between the separation plant and the combustor.

As a result of the inventive retrofitting to the oxy-fuel process, the existing regenerative feed water preheating and the existing air preheating on the flue gas side of the steam generator are integrated into the inventive steam generating plant, and use is made of intermediate superheating. The circuit of the steam generating plant on the combustion air side is selected in such a way that operation with air as the sole oxygen source remains possible without restriction. A conventional steam generating plant can thus be retrofitted to an oxy-fuel plant without any impairment to the ability of the conventional plant to operate with fresh air. Scaling to larger units is possible.

Figure 1:
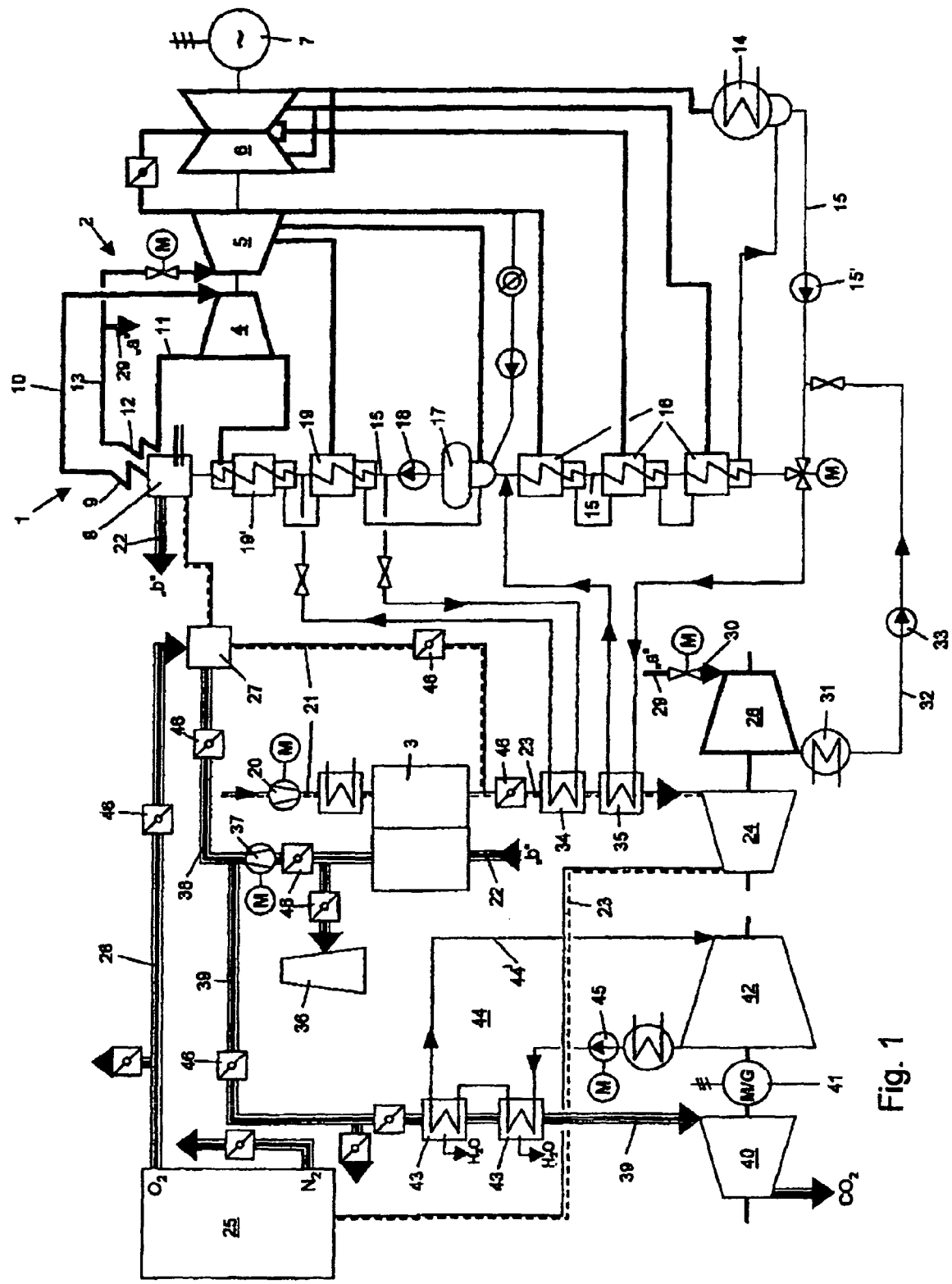
FIG. 1 shows a circuit diagram of a steam generating plant retrofitted to operate with oxygen (oxy-fuel mode)

The steam generating plant comprises a steam generator 1 with a water-steam circuit, a set 2 of steam turbines, an air feed, a flue gas discharge line, and a regenerative air preheater (combustion air preheater) 3, heated by flue gas. To this extent, the steam generating plant is conventional in design. It is explained briefly in the following only to the extent that this is necessary to understand the invention.

DETAILED DESCRIPTION OF THE PREFERRED EMBODIMENTS

The set 2 of steam turbines consists of a high-pressure turbine 4, an intermediate-pressure turbine 5, and a low-pressure turbine 6, which are mounted on a common shaft and which drive a generator 7 to generate electrical energy.

The steam generator 1 illustrated here is designed as a forced-flow steam generator. The following description can also be applied to a drum boiler. The steam generator 1 has a combustor 8, which is fired with gaseous fuel. In principle, the generator could also be coal-fired in conjunction with a flue gas purification system. A superheater 9 is provided after the evaporative heating surfaces of the combustor 8. A high-pressure steam line 10 connected to the superheater 9 leads to the high-pressure turbine 4 of the steam turbine set 2. The exhaust steam outlet of the high-pressure turbine 4 is connected to an intermediate superheater 12 of the steam generator 1 by a connecting line 11. The outlet side of the intermediate superheater 12 is connected to the intermediate-pressure turbine 5 of the steam turbine set 2 by an intermediate steam line 13. The exhaust steam side of the intermediate-pressure turbine 5 is connected to the low-pressure turbine 6.

The exhaust steam outlet of the low-pressure turbine 6 is connected to a condenser 14. A condensate line 15, in which a condensate pump 15' is installed, is connected to the condenser 14. Several low-pressure feed water preheaters 16, a thermal feed water degasser 17, a high-pressure feed water pump 18, and several high-pressure feed water preheaters 19, 19' are installed in series in the condensate line 15. The last high-pressure feed water preheater 19' is connected to an additional, flue gas-heated feed water preheater or to the evaporator of the steam generator 1. The feed water preheaters 16, 19 are heated by steam tapped from the high-pressure turbine 4, from the intermediate-pressure turbine 5, and from the low-pressure turbine 6 of the steam turbine set 2.

A blower 20 is installed in an air feed line 21, which is connected to the inlet-side air section of the regenerative air preheater 3. On the downstream side of the air preheater 3, this air feed line leads to the firing unit of the combustor 8 to supply it with combustion air. A flue gas line 22 is connected to the flue gas outlet of the steam generator 1; this flue gas line proceeds to the inlet-side gas section of the regenerative air preheater 3. Because of the constraints of the drawing, the flue gas line 22 is interrupted at points "b". Following the air preheater 3, the flue gas line 22 proceeds to the stack 36.

The description given so far pertains to a conventional steam generating plant. How the steam generating plant can be retrofitted to create an oxy-fuel plant will be described next. This retrofitting can be undertaken afterwards on an already existing plant or can be done from the very start in a new steam generating plant.

An air line 23 is branched off from the air feed line 21 at a point downstream of the air preheater 3 and extended to an air compressor 24. The outlet of the air compressor 24 is connected to an air separation plant 25. The oxygen outlet of the air separation plant 25 is connected to a gas mixer 27 by an oxygen line 26; the gas mixer is installed in the air feed line 21 extending between the air preheater 3 and the firing unit of the combustor 8 of the steam generator 1.

The air compressor 24 is driven by a steam drive turbine 28. In the embodiment according to FIG. 1, the steam drive turbine 28 is operated with steam taken by way of a steam line 29 from the intermediate steam line 13 located between the intermediate superheater 12 of the steam generator 1 and the intermediate-pressure turbine 5 of the steam turbine set 2. Because of the constraints of the drawing, the steam line 29 is interrupted at the points "a". Upstream of the entrance to the steam drive turbine 28, a control valve 30 is installed in the steam line 29. The exhaust steam from the steam drive turbine 28 is sent to a condenser 31, which is connected to the condensate line 15 of the steam generator 1 by a condensate line 32, in which a pump 33 is installed. The connection is established at a point upstream of the first low-pressure feed water preheater of the low-pressure feed water preheater group 16.

If the way in which the main condenser 14 of the steam generator 1 is designed allows the possibility, the exhaust steam from the steam drive turbine 28 can be sent to this main condenser 14. As a result, the condenser 31 of the drive-steam turbine 28 and the associated condensate pump 33 can be eliminated.

Figure 2:
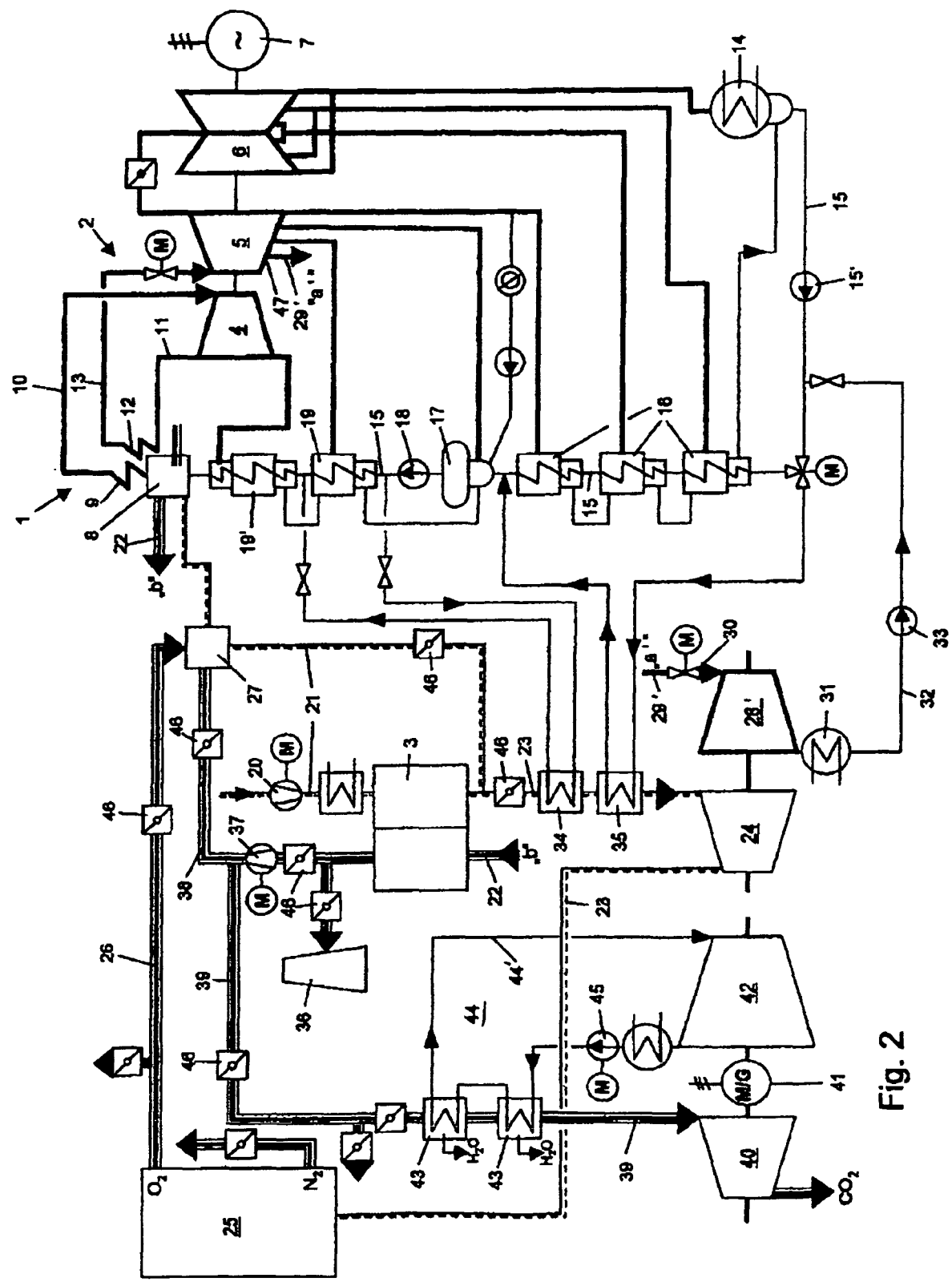
FIGS. 2-4 show additional embodiments of the steam generating plant according to FIG. 1.

FIG. 2 shows a steam drive turbine 28', which is operated not with intermediate steam but rather with tapped steam. The tapped steam is taken from a suitable tapping stage 47 of the steam turbine set 2 and sent to the steam drive turbine 28' through a steam line 29'.

Figure 3:
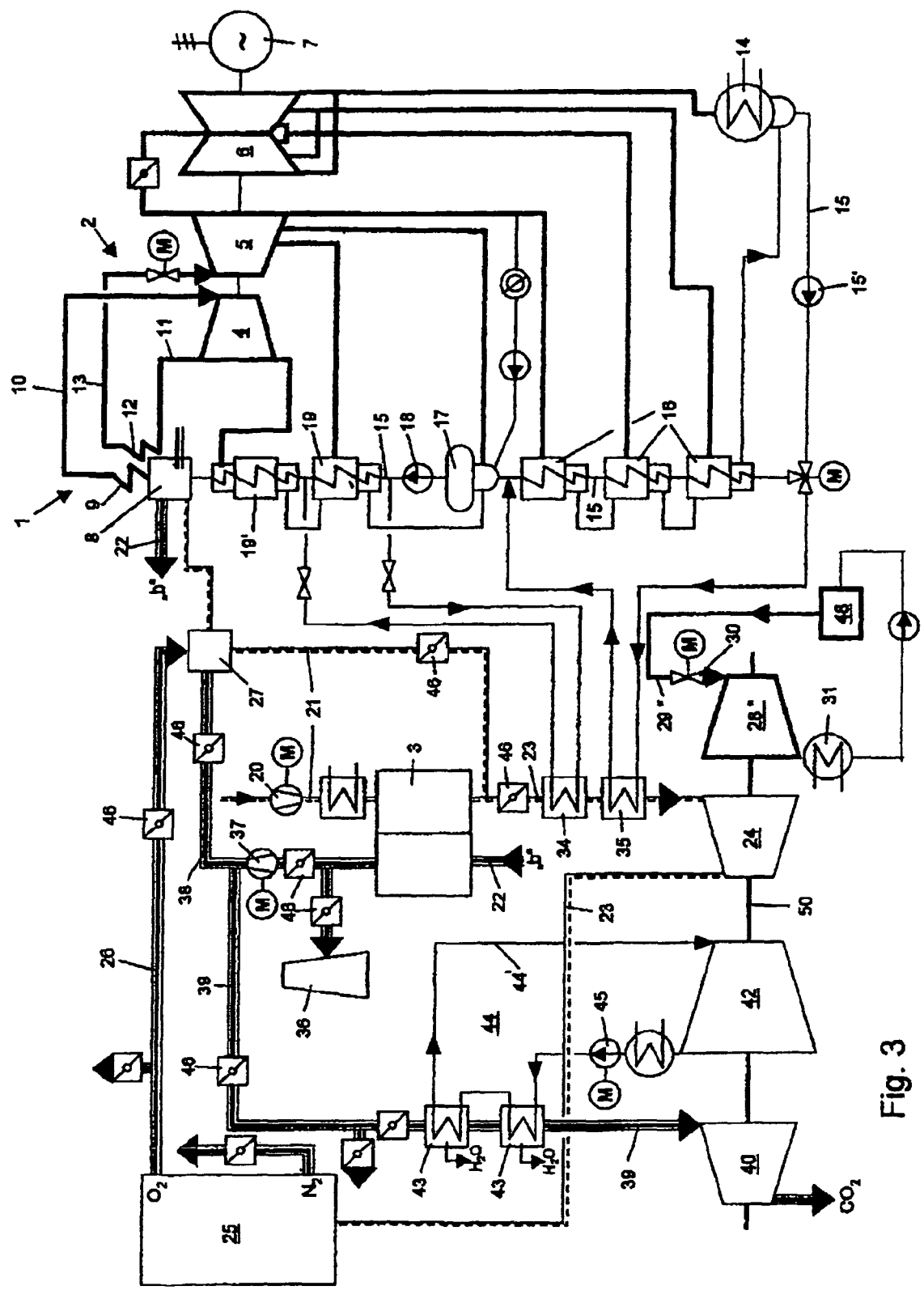

According to FIG. 3, a steam drive turbine 28" can also be used, which is operated with steam from an external steam source 48 via a steam line 29". This external steam source can be a directly fired steam generator.

Figure 4:
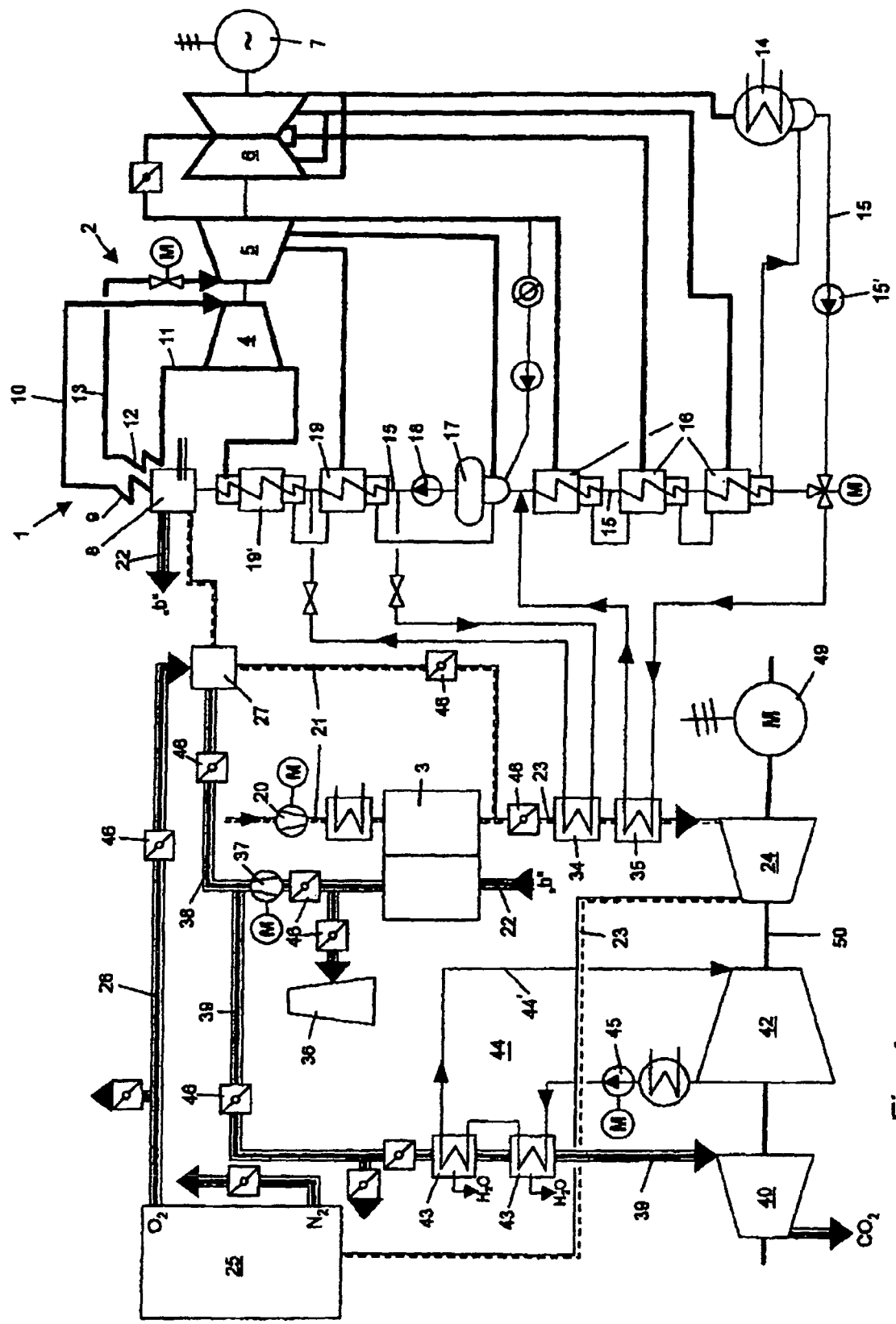

In place of a steam drive turbine 28, 28', 28", it is also possible to use an electric motor 49, as shown in FIG. 4, to drive the air compressor 24.

Two air coolers 34, 35 are installed in the air line 23 between the air preheater 3 and the air compressor 24. The air coolers 34, 35, like the steam drive turbine 28 which drives the air compressor 24, are integrated into the water-steam circuit of the steam generator 1. High-pressure feed water flows through the air cooler 34 installed downstream of the air preheater 3; this feed water is taken from the condensate line 15 upstream of the high-pressure feed water preheater 19 and is returned to the condensate line 15 upstream of this high-pressure feed water preheater 19. If the temperature of the steam in the intermediate superheater 12 of the steam generator 1 is controlled by internal recirculation of flue gas, then the last high-pressure feed water preheater 19' can also be connected to the air cooler 34. Low-pressure feed water flows through the air cooler 35 installed downstream of the air cooler 34; this feed water is taken from the condensate line 15 upstream of the low-pressure feed water preheater group 16 and is returned to the condensate line 15 downstream of the low-pressure feed water preheater group 16.

A recirculation blower 37 is installed in the flue gas line 22, downstream from the regenerative air preheater 3 and from a branch leading to the stack 36. Downstream from the recirculation blower 37, the flue gas line 22 branches into two flue gas secondary lines 38, 39. The first flue gas secondary line 38 leads to the gas mixer 27.

The second flue gas secondary line 39 leads to a $CO_2$ compressor 40. The $CO_2$ compressor 40 is driven by an expander 42 and a motor/generator 41. The $CO_2$ compressor 40 and the expander 42 are mounted on the same shaft as the motor/generator 41.

As illustrated by way of example in FIGS. 3 and 4, the motor/generator 41 can be eliminated. Instead, the air compressor 24, the expander 42, and the $CO_2$ compressor 40 are mounted together with either the steam drive turbine 28" or the electric motor 49 as drive means on a single-shaft power train 50. It should be emphasized that the drive train shown in FIGS. 3 and 4 can also be used in a steam generating plant according to FIGS. 1 and 2, just as it is also possible for the drive train according to FIGS. 1 and 2 to be used in a steam generating plant according to FIGS. 3 and 4.

Heat exchangers 43 for cooling the flue gas below the water dew point are installed in the second flue gas secondary line 39 before it arrives at the $CO_2$ compressor 40, as a result of which water is separated from the flue gas. The heat exchangers 43 are connected to the expander 42 by a connecting line 44', thus forming a Rankine cycle 44, in which a coolant with a low boiling point, e.g., $NH_3$, is used as the working medium. A pump 45 connected to the outlet of the expander 42 circulates the working medium through the heat exchangers 43 and the expander 42.

As shown in the drawing and described above, the air line 23, which leads via the air compressor 24 to the air separation plant 25 and includes the air coolers 34, 35, and the oxygen line 26, which leaves the air separation plant 25, are connected in parallel to the air feed line 21 leading to the combustor 8. Shutoff/control valves 46 in the air feed line 21, in the air line 23, in the oxygen line 26, in the first flue gas secondary line 38, and in the second flue gas secondary line 39 make it possible to shut off the line in question and to control the medium flowing through it.

The previously described steam generating plant is operated as follows. The air required for the oxy-fuel process, that is, the air required to operate the plant with oxygen, is cooled to the lowest possible temperature in the coolers 34, 35 downstream of the regenerative air preheater 3 by the use of steam turbine condensate and then compressed in the air compressor 24 to the pressure required for the air separation plant 25.

The air compressor 24 is driven by the steam drive turbine 28, 28', which is fed with intermediate steam from the intermediate superheater 12 or with tapped steam from the tapping stage 47 of the intermediate-pressure turbine 5 of the steam turbine set 2. The power loss of the steam turbine set 2 is small, because the removal of the intermediate or tapped steam is partially compensated quantitatively by shifting the heat of the combustion air into the condensate circuit of the steam generator 1. This is done by closing or only partially opening the tapping points of the steam lines on the medium-pressure and the low-pressure side. The condensate accumulating from the steam drive turbine 28, 28' is added to the condensate circuit of the steam generator 1. As a result, there is no need for an additional degasser or an additional steam condensate system. Because the heat of the combustion air is shifted from the air preheater 3 into the condensate feed water circuit of the steam generator 1, the power loss caused by the removal of intermediate steam or tapped steam to drive the steam drive turbine 28, 28' is almost completely compensated.

If the absorption capacity of the steam turbine set 2 is sufficient and if the generator 7 still has additional reserves, it would be possible to disconnect the drive of the air compressor 24 from the intermediate steam rail of the intermediate-pressure turbine 5 of the steam turbine set 2, this rail consisting of the intermediate steam line 13 and the tapping stage 47. Either an electric motor or a pure steam turbine process with a direct-fired steam generator could be used a drive source. The advantage of such conceptions lies in the latter case both in the freedom of choice with respect to the steam parameters and in the improved dynamics of the process of switching the steam generating plant over to operation with pure air in the event that the additional turbomachines used for the oxy-fuel process have to be tripped. To increase the efficiency of the drive process, the intermediate heat and the recooler heat of the air compressor 24 could also be integrated beneficially into the concept of the retrofitted plant.

The air for the air separation plant 25 is compressed by the air compressor 24 to the pressure necessary for the air separation plant 25. It can be effective to combine axial and radial compressors with intermediate coolers and recoolers in steam generating plants with higher power outputs. In principle, the drive power can also be supplied exclusively by electric motors.

The startup of the steam generating plant occurs with the blower 20 at 100% load, where approximately 60% of the air, which represents the minimum load of the air separation plant 25, is sent to the air separation plant 25, and approximately 40% of the air, which represents the minimum load of the forced-flow steam generator or of a natural-convection boiler, is sent to the steam generator 1. These values can be varied as appropriate, depending on the process. The steam generator 1 operates in partial-load, fresh-air mode until the air separation plant 25 is producing $O_2$ of the desired quality. Then the plant is switched over from partial-load air mode to the corresponding partial-load oxygen mode of the oxy-fuel process. The loads are increased further under consideration of the allowable values of the air separation plant 25. A plant operating in oxygen mode is shut down in the opposite direction by switching back to air mode first.

Because no nitrogen is present during combustion with oxygen, the mass flow rate of the flue gas in the flue gas line of the steam generator 1 is correspondingly lower than that which occurs during fresh-air mode, and the firing temperatures are also significantly higher. This increase in the firing temperatures would lead to considerable thermal loads on the pipes in the combustor 8 of the steam generator 1, but, by spraying a high predetermined return flow of flue gas into the firing system of the steam generator 1 via the gas mixer 27, both the mass flow rate and the combustion temperatures are adjusted to values similar to those of fresh-air mode. Through the mixing of oxygen and recirculated flue gas in the gas mixer 27, $O_2$ contents similar to those of fresh-air mode are achieved. For thermodynamic reasons, the recirculated flue gas is discharged downstream of the air preheater 3.

As previously mentioned, all of the plant components belonging to the oxy-fuel process are connected in parallel to the steam generating plant. In addition, shut-off/control valves 46 are installed in the air feed line 21, in the air line 23, in the oxygen line 26, in the first flue gas secondary line 38, and in the second flue gas secondary line 39. In this way, the oxy-fuel process is integrated into the steam generating plant 1 in such a way that it is also possible at any time to operate in pure fresh-air mode without supplying oxygen. For this purpose, the appropriate shutoff/control valves 46 are to be closed. The steam generating plant 1 can also be operated in pure fresh-air mode in the event that one of the turbomachines such as the air compressor 24, the expander 42, or the $CO_2$ compressor 40 breaks down or if the machines are shut off. After completion of the installation of the parallel-connected plant components belonging to the oxy-fuel process, a short-circuit is created during the time that the steam generating plant is being inspected.

To remove the water, the remaining flue gas, consisting primarily of $CO_2$, is cooled to a temperature far below the water dew point of the flue gas by way of the Rankine cycle 44 based on $NH_3$. As a result of the release of the heat of evaporation of the steam component and the latent heat of the flue gas, it is possible to recover additional electrical energy via the expander 42.

The expander 42 drives the $CO_2$ compressor via the motor/generator 41; the compressor produces the predetermined final $CO_2$ pressure required for the purpose in question. A compression to 200 bars can be achieved for an EOR process (Enhanced Oil-Recovering process). Depending on the required drive power of the compressor 40, operation will proceed in either motor or generator mode.

What is claimed is:

1. A steam generating plant comprising:
   a steam generator comprising a combustor, an evaporator, a superheater, an intermediate superheater, a condenser, and feed water pre-heaters heated regeneratively by steam;
   a set of steam turbines comprising a high pressure turbine, an intermediate pressure turbine, and a low pressure turbine;
   a condensate circuit connected to the steam generator, said circuit comprising said condenser;
   a flue gas line connected to the combustor;
   an air feed line for supplying combustion air to the combustor;
   an air pre-heater wherein the combustion air is pre-heated by the flue gas, the flue gas line and the air feed line being connected through the air pre-heater;
   an air line connected to the air feed line at a connection downstream of the air pre-heater;
   air coolers installed in the air line downstream of the connection, the air coolers being cooled by condensate from said condensate circuit;
   an air separation plant connected to the air line downstream of the air coolers, the air separation plant having an oxygen outlet, and
   an oxygen line connecting the oxygen outlet to the combustor.

2. The steam generator of claim 1 further comprising an air compressor installed in the air line between the air coolers and the air separation plant.

3. The steam generating plant of claim 1 wherein the air line and the oxygen feed line are connected to the combustor in parallel to the air feed line.

4. The steam generating plant of claim 1 further comprising a shut-off valve in each of the air feed line, the air line, and the oxygen line.

5. The steam generating plant of claim 2 further comprising a drive turbine which drives the compressor, wherein the drive turbine is operated with steam from one of the intermediate superheater and a tapping stage of the steam turbine set.

6. The steam generating plant of claim 5 wherein the drive turbine is connected to the condensate circuit via a condenser and a condensate line.

7. The steam generating plant of claim 2 further comprising a drive turbine which drives the compressor, wherein the drive turbine is operated with steam from an external steam source.

8. The steam generating plant of claim 2 further comprising an electric motor which drives the compressor.

9. The steam generating plant of claim 1 further comprising
a first flue gas secondary line downstream of the air pre-heater; and
a gas mixer connected to the combustor, the first flue gas secondary line, the oxygen line, and the air feed line leading to the gas mixer.

10. The steam generating plant of claim 1 further comprising
a second flue gas secondary line downstream of the air pre-heater; and
a $CO_2$ compressor connected to the second secondary flue gas line.

11. The steam generating plant of claim 10 further comprising
heat exchangers in the second flue gas secondary line between the air pre-heater and the $CO_2$ compressor, said heat exchangers being capable of cooling the flue gas to a temperature below its water dew point; and
a Rankine cycle comprising an expander connected to the heat exchangers by a connecting line which carries a coolant with a low boiling point.

12. The steam generating plant of claim 11 wherein the expander drives the $CO_2$ compressor.

13. The steam generating plant of claim 12 further comprising a motor/generator installed between the compressor and the expander.

14. The steam generating plant of claim 11 further comprising an air compressor installed in the air line between the air coolers and the air separation plant, and means for driving the air compressor, wherein the air compressor, the means for driving the air compressor, the expander, and the $CO_2$ compressor are mounted on a common shaft.

15. A method for operating a steam generation plant comprising a steam generator comprising a combustor, an evaporator, a superheater, an intermediate superheater, a condenser, and feed water pre-heaters heated regeneratively by steam; a set of steam turbines comprising a high pressure turbine, an intermediate pressure turbine, and a low pressure turbine; a condensate circuit connected to the steam generator, said circuit comprising said condenser; a flue gas line connected to the combustor; an air feed line for supplying combustion air to the combustor; and an air pre-heater wherein the combustion air is pre-heated by the flue gas, the flue gas line and the air feed line being connected through the air pre-heater; the method comprising:
diverting an air stream from the air feed line downstream of the air-preheater to an air separation plant via an air line;
cooling the air stream in the air line by condensate from said condensate circuit;
separating the air stream in the air separation plant into an $O_2$ fraction and an $N_2$ fraction;
sending the $O_2$ fraction to the combustor through an oxygen line.

16. The method of claim 15 further comprising, between the cooling and separating steps, compressing the air in the air line using an air compressor.

17. The method of claim 16 further comprising
diverting flue gas from the flue gas line downstream of the air pre-heater to a $CO_2$ compressor via a flue gas secondary line;
cooling the flue gas in the secondary line to a temperature below its water dew point in heat exchangers by a Rankine cycle with an expander using a coolant with a low boiling point; and
compressing the cooled flue gas in the $CO_2$ compressor.

18. The method of claim 15 further comprising, if a component fails,
shutting off the air line and the oxygen line; and
supplying fresh air to the air feed line.

19. The method of claim 15 further comprising
short-circuiting devices connected in parallel to the steam generator; and
inspecting the steam generating plant while the devices are short-circuited.

20. The method of claim 17 further comprising:
integrating intermediate and after-cooling heats of the air compressor in the Rankine cycle; and
generating additional drive energy for the $CO_2$ compressor using said heats.

21. A method for retrofitting a steam generation plant comprising a steam generator comprising a combustor, an evaporator, a superheater, an intermediate superheater, a condenser, and feed water pre-heaters heated regeneratively by steam; a set of steam turbines comprising a high pressure turbine, an intermediate pressure turbine, and a low pressure turbine; a condensate circuit connected to the steam generator, said circuit comprising said condenser; a flue gas line connected to the combustor; an air feed line for supplying combustion air to the combustor; and an air pre-heater wherein the combustion air is pre-heated by the flue gas, the flue gas line and the air feed line being connected through the air pre-heater; the method comprising:
connecting an air line to the air feed line at a connection downstream of the air pre-heater;
installing air coolers in the air line downstream of the connection, wherein the air coolers are cooled by condensate from the condensate circuit;
installing an air separation plant in the air line downstream of the air coolers, the separation plant separating an air stream in the air line into an $O_2$ fraction and an $N_2$ fraction, the separation plant having an oxygen outlet for the oxygen fraction;
connecting the oxygen outlet to the combustor by means of an oxygen line.

22. The method of claim 21 further comprising, installing an air compressor in the air line between the air coolers and the air separation plant.

23. The method of claim 21 further comprising
connecting a flue gas secondary line to the flue gas line downstream of the air pre-heater;
installing heat exchangers in the secondary flue gas line, wherein the heat exchangers cool flue gas in the secondary line to a temperature below its water dew point by a Rankine cycle with an expander using a coolant with a low boiling point; and
connecting the secondary flue gas line to a $CO_2$ compressor downstream of the heat exchangers.

* * * * *